(12) United States Patent
Lublasser et al.

(10) Patent No.: US 12,410,947 B2
(45) Date of Patent: Sep. 9, 2025

(54) SOLAR INSTALALLATION

(71) Applicant: ANYWHERE.SOLAR GmbH, Oberalm (AT)

(72) Inventors: Martin Lublasser, Wals (AT); Stephan Perrer, Anif (AT)

(*) Notice: Subject to any disclaimer, the term of this patent is extended or adjusted under 35 U.S.C. 154(b) by 83 days.

(21) Appl. No.: 18/290,008

(22) PCT Filed: Apr. 12, 2022

(86) PCT No.: PCT/AT2022/060113
§ 371 (c)(1),
(2) Date: Nov. 8, 2023

(87) PCT Pub. No.: WO2022/241489
PCT Pub. Date: Nov. 24, 2022

(65) Prior Publication Data
US 2024/0255187 A1 Aug. 1, 2024
US 2025/0224149 A9 Jul. 10, 2025

(30) Foreign Application Priority Data

May 17, 2021 (AT) .............. A 50381/2021

(51) Int. Cl.
F24S 40/00 (2018.01)
F24S 30/425 (2018.01)
(Continued)

(52) U.S. Cl.
CPC ............ F24S 40/00 (2018.05); F24S 30/425 (2018.05); F24S 40/85 (2018.05); F24S 50/60 (2018.05); H02S 20/32 (2014.12); F24S 30/452 (2018.05)

(58) Field of Classification Search
CPC .. F24S 40/00; F24S 40/10; F24S 40/85; F24S 30/452; F24S 30/425; F24S 50/60; H02S 20/32

See application file for complete search history.

(56) References Cited

U.S. PATENT DOCUMENTS 3,906,927 A * 9/1975 Caplan ................ F24S 20/20
126/696
4,373,783 A * 2/1983 Anderson ............ F24S 23/77
359/848

(Continued)

FOREIGN PATENT DOCUMENTS

DE 4443834 A1 * 6/1996 ............ F24J 2/4607
DE 202012010121 U1 * 3/2013 ............ F24J 2/4607

(Continued)

Primary Examiner — Stanton L Krycinski
(74) Attorney, Agent, or Firm — Tiajoloff & Kelly LLP

(57) ABSTRACT

A solar installation has a support (1) and a support frame (4) for solar modules (6), which are combined to form a solar panel (7). The support frame (4) can be pivoted on the support (1) about an elevation axis (5) and the support frame (4) forms, with respect to the elevation axis (5), a bottom section (10) on the ground side and an adjoining top section (11), whose width extension ($L_2$) perpendicular to the elevation axis (5) is greater than the width extension ($L_1$) of the bottom section (10). The top section (11) of the solar panel (7) has flow passage openings (12) at least between groups of solar modules (6) while the bottom section (10) is at least largely wind-impermeable.

4 Claims, 1 Drawing Sheet

(51) Int. Cl.
*F24S 30/452* (2018.01)
*F24S 40/80* (2018.01)
*F24S 50/60* (2018.01)
*H02S 20/32* (2014.01)

(56) References Cited

U.S. PATENT DOCUMENTS

| | | | | |
|---|---|---|---|---|
| 4,476,854 A * | 10/1984 | Baer | F24S 30/452 | 136/246 |
| 5,228,924 A * | 7/1993 | Barker | H02S 20/30 | 136/246 |
| 6,563,040 B2 * | 5/2003 | Hayden | F24S 25/50 | 126/600 |
| 7,476,832 B2 * | 1/2009 | Vendig | H02S 20/23 | 250/203.1 |
| 7,557,292 B2 * | 7/2009 | Shingleton | F24S 25/12 | 136/246 |
| 7,795,568 B2 * | 9/2010 | Sherman | F24S 40/00 | 250/203.1 |
| 8,324,496 B1 * | 12/2012 | Gross | H02S 20/24 | 136/246 |
| 8,468,755 B2 * | 6/2013 | Zuritis | F24S 25/65 | 52/153 |
| 8,499,756 B2 * | 8/2013 | Bathurst | H02S 20/32 | 126/579 |
| 8,513,514 B2 * | 8/2013 | Sherman | F24S 40/00 | 250/203.1 |
| 8,539,943 B2 * | 9/2013 | Harrenstien | F24S 23/745 | 126/696 |
| 8,609,977 B2 * | 12/2013 | Jones | F24S 30/425 | 250/203.1 |
| 8,720,431 B2 * | 5/2014 | Kufner | F24S 25/12 | 126/569 |
| 8,763,316 B2 * | 7/2014 | Concho | E04D 13/00 | 52/173.3 |
| 8,936,164 B2 * | 1/2015 | Durney | H10F 19/00 | 136/251 |
| 8,984,817 B2 * | 3/2015 | Weiden | F16C 33/08 | 52/173.3 |
| 9,134,045 B2 * | 9/2015 | Ashmore | F24S 30/452 | |
| 9,471,050 B2 * | 10/2016 | Tilley | H02S 20/10 | |
| 9,496,441 B2 * | 11/2016 | Park | F24S 30/452 | |
| 9,627,921 B2 * | 4/2017 | Romeo | H02S 20/32 | |
| 10,190,803 B2 * | 1/2019 | Simonette | F24S 30/452 | |
| 10,560,051 B2 * | 2/2020 | Iwasaki | H02S 20/10 | |
| 10,917,042 B2 * | 2/2021 | Loven | H02S 20/32 | |
| 10,965,242 B2 * | 3/2021 | Mori | H02S 40/22 | |
| 11,050,383 B2 * | 6/2021 | Watson | F24S 30/425 | |
| 11,063,553 B2 * | 7/2021 | Poivet | H02S 30/10 | |
| 11,165,386 B2 * | 11/2021 | Casla Urteaga | H02S 10/40 | |
| 11,422,575 B2 * | 8/2022 | Needham | F24S 50/60 | |
| 11,855,581 B2 * | 12/2023 | Schatz | H02S 20/32 | |
| 11,976,687 B2 * | 5/2024 | Sasidharan | H02S 20/10 | |
| 2009/0293861 A1 * | 12/2009 | Taylor | H02S 20/10 | 126/600 |
| 2010/0065039 A1 * | 3/2010 | Chang | F24S 30/425 | 126/573 |
| 2010/0212654 A1 | 8/2010 | Alejo Trevijano | | |
| 2011/0100429 A1 | 5/2011 | Mughal | | |
| 2012/0314314 A1 * | 12/2012 | Wang | F24S 30/452 | 359/853 |
| 2013/0008431 A1 | 1/2013 | Fitch | | |
| 2013/0019921 A1 * | 1/2013 | Au | H02S 20/10 | 136/246 |
| 2013/0032135 A1 * | 2/2013 | Waterhouse | F24S 50/20 | 33/365 |
| 2013/0048048 A1 * | 2/2013 | Flanery | F24S 40/20 | 136/246 |
| 2013/0192659 A1 * | 8/2013 | Upton | G01S 3/7861 | 136/246 |
| 2013/0269753 A1 * | 10/2013 | Corio | F24S 25/10 | 136/246 |
| 2014/0076400 A1 * | 3/2014 | Chung | F24S 30/452 | 136/259 |
| 2014/0196387 A1 * | 7/2014 | Neito | H02S 20/22 | 52/173.3 |
| 2014/0209146 A1 * | 7/2014 | Park | F24S 40/85 | 136/246 |
| 2014/0326294 A1 | 11/2014 | Inoue | | |
| 2015/0076314 A1 | 3/2015 | Holze | | |
| 2016/0118929 A1 * | 4/2016 | Krause | H02S 20/32 | 136/246 |
| 2017/0191700 A1 * | 7/2017 | Fisher | F24S 30/452 | |
| 2017/0244355 A1 * | 8/2017 | Yanagi | F24S 30/452 | |
| 2018/0054156 A1 | 2/2018 | Lokey | | |
| 2019/0253020 A1 * | 8/2019 | Chen | H02S 50/00 | |
| 2021/0071914 A1 * | 3/2021 | Worden | H02S 20/32 | |
| 2021/0194417 A1 * | 6/2021 | Sharpe | G05D 3/105 | |
| 2022/0182009 A1 * | 6/2022 | Poivet | E04B 1/0046 | |
| 2022/0239249 A1 * | 7/2022 | Kumar | H02S 30/10 | |

FOREIGN PATENT DOCUMENTS

| | | | | |
|---|---|---|---|---|
| DE | 102011115474 A1 | 6/2013 | | |
| DE | 102013003687 A1 * | 3/2014 | | F24S 23/77 |
| EP | 2746698 A2 * | 6/2014 | | F24S 30/452 |
| FR | 2354590 A1 * | 1/1978 | | |
| FR | 2557370 A1 * | 6/1985 | | |
| FR | 2917237 A1 * | 12/2008 | | F24J 2/541 |
| FR | 2976057 A1 * | 12/2012 | | F16H 19/001 |
| GB | 2538222 A * | 11/2016 | | E04D 13/004 |
| JP | 5569447 B2 * | 8/2014 | | F24S 30/452 |
| KR | 100892061 B1 * | 4/2009 | | |
| WO | WO-2004044501 A1 * | 5/2004 | | F24S 30/422 |
| WO | 2009/059093 A1 | 5/2009 | | |
| WO | WO-2009132603 A1 * | 11/2009 | | F24J 2/542 |
| WO | 2009/150466 A1 | 12/2009 | | |
| WO | 2010/122009 A1 | 10/2010 | | |
| WO | WO-2014104468 A1 * | 7/2014 | | F24J 2/4638 |
| WO | WO-2020010360 A1 * | 1/2020 | | E04B 1/34363 |

* cited by examiner

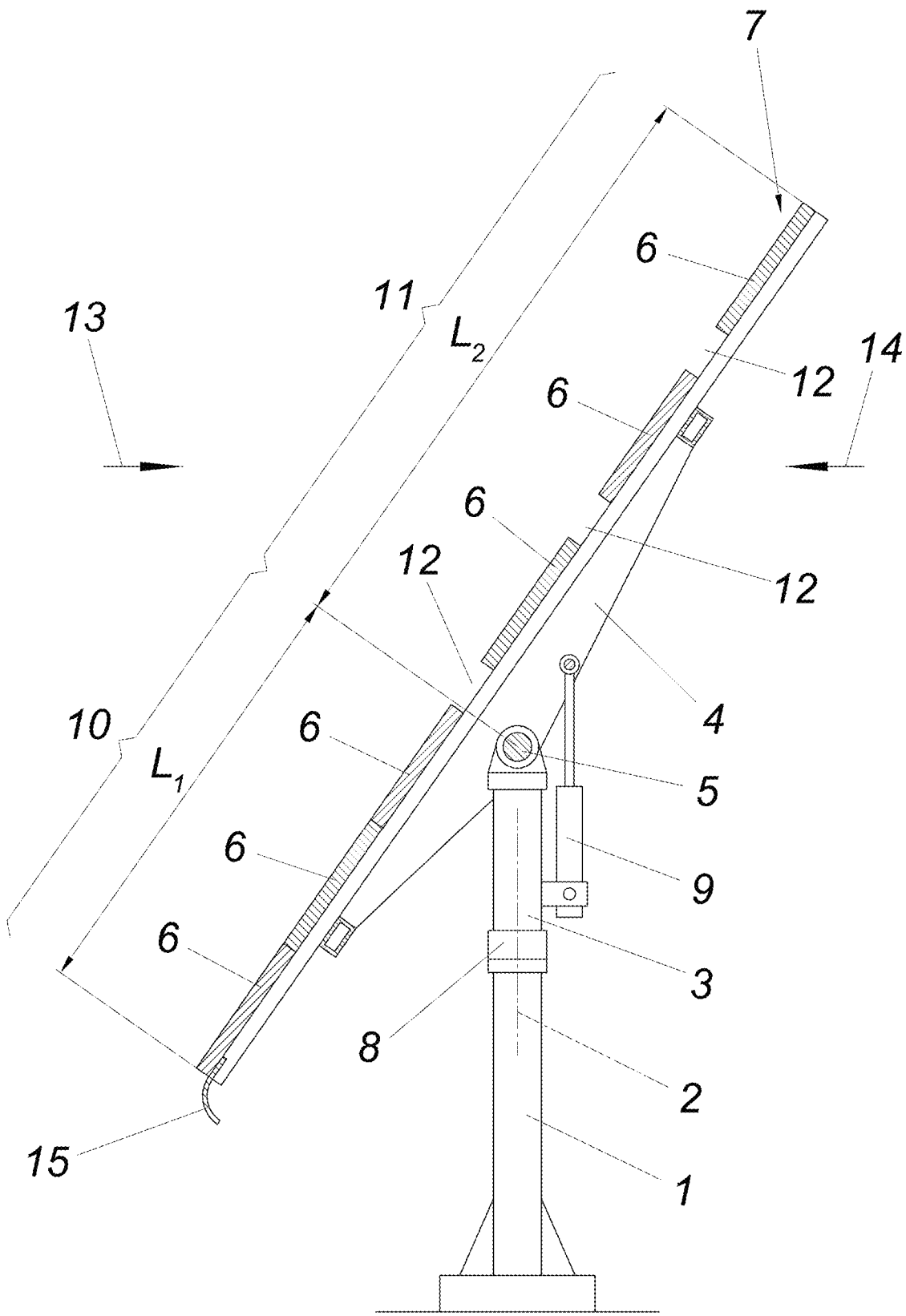

SOLAR INSTALALLATION

FIELD OF THE INVENTION

The invention relates to a solar installation having a support and having a support frame for solar modules, which are combined to form a solar panel, which support frame can be pivoted on the support about an elevation axis and which support frame forms, with respect to the elevation axis, a bottom section on the ground side and an adjoining top section, whose width extension perpendicular to the elevation axis is greater than the width extension of the bottom section.

STATE OF THE ART

In order to ensure good efficiency, the solar panels of solar installations must track the position of the sun. For this purpose, the solar panels are mounted in a—about an elevation axis—pivotable way on a plate that can be rotated about an azimuth axis. For the actuator to swivel the solar panel, simple design conditions result if the elevation axis runs at least approximately through the center of gravity of the solar panel. However, such a center of gravity position prevents the solar panel from pivoting independently about the elevation axis into a wind-parallel safety position with only a small attack surface for the wind during high gusts of wind. In order to improve the flow conditions, it has already been suggested in this context (DE 10 2011 115 474 A1) to equip the solar panel with additional, adjustable wind guiding devices, which, however, make the design complex and prone to failure.

With regard to the mounting of a solar panel about the elevation axis and the actuator provided for this purpose, simple design conditions result (WO 2009/059093 A1) if the solar panel is arranged with respect to the elevation axis in such a way, that the width extension of an top panel section perpendicular to the elevation axis is greater than that of a bottom section, for example by one solar module row, so that with a wind direction on the panel front side both the weight moment and the resulting wind moment become effective in the sense of a swinging away of the solar panel. If this total torque supported by the actuator exceeds a predefined threshold value, a safety clutch is triggered and the solar panel is released to swing down to the safety position. However, it is disadvantageous that in the case of wind loads in the opposite direction and thus wind forces that have a lifting effect, the force coefficients that must also be observed for solar panels in accordance with the standard and that are specified for free-standing monopitch roofs and that depend on the angle of inclination must be used, which are greater than the force coefficients for pressing wind loads, which results in corresponding dimensioning of the supports and their anchoring.

SUMMARY OF THE INVENTION

The invention is thus based on the task of designing a solar installation with a solar panel mounted off-center with respect to the elevation axis without any special construction effort in such a way that, compared to the state of the art, either a larger, effective solar panel area can be provided with the same dimensioned support or a smaller dimensioned support can be provided with the same solar panel area.

Based on a solar installation of the type described at the beginning, the invention solves the problem posed by the fact that, characterized in that, while the bottom section is at least largely wind-impermeable, the top section of the solar panel has flow passage openings at least between groups of solar modules.

Due to the flow passage openings provided in the top section of the solar panel, the dynamic pressure occurring in the area of the top section during a wind load is considerably reduced compared to a largely closed area of the bottom section, which leads to a reduction in the resulting wind force acting on the solar panel. In the case of a wind flow in the direction of the front side of the solar modules, this initially means a smaller wind torque effective in the sense of a swinging away of the solar panel, which, however, has no influence on the possibility of independently moving the solar panel into the swung away safety position with the elevation actuator uncoupled, because the weight moment helps and the safety position is reached even if the resulting wind moment acts in the opposite direction to the weight moment, but is smaller than the weight moment.

When the wind flow onto the solar panel comes from the rear of the solar modules, the wind force acting on the top section of the solar panel forms a counter-torque to the weight-related torque. Since the dynamic pressure across the width of the solar panel is lower in the top section than in the bottom section due to the flow passage openings when the wind speeds are the same, advantageous conditions for the transfer of the wind loads can also be ensured for this load case if the ratio of the width extensions of the top and bottom sections is adjusted to the flow cross sections of the flow passage openings.

Within a solar panel, the solar modules are usually arranged in rows on the support frame of the solar panel. This arrangement allows flow passage openings that extend between the rows of solar modules, preferably along the length of the solar module in the direction of the elevation axis.

In order to increase the wind torque effective on the bottom section of the solar panel in the case of a wind flow to the rear in the sense of a swinging away of the solar panel into the safety position, a wind guiding device can be provided at the ground-side edge of the bottom section of the solar panel, which should, however, be designed in such a way that the flow conditions do not have a detrimental effect on the torque load of the solar panel in the case of a wind flow to the front.

BRIEF DESCRIPTION OF THE INVENTION

In the drawing, the object of the invention is shown, for example, a solar installation according to the invention is shown in a schematic section perpendicular to the elevation axis.

DESCRIPTION OF THE PREFERRED EMBODIMENTS

The solar installation shown is mounted on a support 1 placed on a foundation, which has a mounting head 3 rotatable about an azimuth axis 2 for a support frame 4, which is mounted on the mounting head 3 so as to be pivotable about an elevation axis 5. Solar modules 6 are arranged in rows on the support frame 4 to form a solar panel 7. To track this solar panel 7 according to the azimuth of the sun, an actuator 8 is provided for the mounting head 3. The solar panel 7 is tracked around the elevation axis by means of an actuator 9 in the form of a swivel cylinder.

As can be seen from the drawing, the solar panel 7 is not symmetrical with respect to the elevation axis 5. The bottom section 10 on the ground side has a width extension $L_1$ perpendicular to the elevation axis 5, which width extension $L_1$ is smaller than the width extension $L_2$ of the adjoining top section 11. This causes a shift of the center of gravity of the solar panel 7 into the top section 11 with the effect that a weight moment becomes effective with respect to the elevation axis 5, which acts on the solar panel 7 in a downward pivoting direction.

In addition, flow passage openings 12 are provided in the top section 11 at least between groups of solar modules 6, and preferably between the rows of solar modules 6 arranged in rows. The resulting wind permeability in certain areas entails a lower dynamic pressure in the region of the top section 11 compared to the substantially wind-impermeable bottom section 10, as a result of which the wind-induced forces and moments acting on the solar panel 7 and thus the calculated loads to be taken into account for dimensioning the support 1 and its foundation change considerably.

Due to the special design and mounting of the solar panel 7, the moment of weight about the elevation axis 5 supported by the actuator 9 relative to the mounting head 3 is increased by the torque due to the wind load of the top section 11 when there is a wind load in direction 13 on the front side of the solar panel 7. This means that despite a lower dynamic pressure in the top section 11, a resulting torque in the sense of a swinging away of the solar panel 7 is always effective, so that a risk of overload due to gusts of wind can simply be avoided, because the loads associated with such gusts of wind can be used for an independent unlocking of the solar panel 7, either by providing a predetermined breaking point or a clutch releasing the actuator 9. In both cases, the support of the solar panel 7 is released by the actuator 9 and as a result the solar panel 7 is pivoted into a wind-parallel safety position with a comparatively small area of attack for the wind. Due to the lower dynamic pressure in the area of the top section 11, the resulting wind force to be supported by the support 1 is also smaller.

For a wind flow 14 directed towards the rear side of the solar panel 7, the raising moment caused by the wind load of the top section 11 is reduced by the weight moment of the solar panel 7, which, with the moment effective in terms of the weight moment caused by the wind load of the bottom section 10, leads to a corresponding torque relief of the solar panel 7. To support this effect, the bottom section 10 of the solar panel 7 can be provided with a wind deflector 15 along the longitudinal edge on the ground side, which provides additional lift in the case of a wind inflow in the direction of arrow 14, but can hardly change the wind load of the solar panel 7 in the case of an inflow direction 13 in the opposite direction.

In addition, due to the different dynamic pressures in the area of the bottom and top sections 10, 11 of the solar panel 7, a lower resulting wind force can be expected compared to a wind-impermeable solar panel 7. This is of particular importance with regard to the larger force coefficient for the wind direction due to the lifting wind load, which force coefficient is to be used according to the standard for determining the maximum load to be absorbed, so that the supporting structure can be dimensioned weaker for a comparable area of a solar panel according to the state of the art or the area of the solar panel can be increased for a comparable supporting structure.

The invention claimed is:

1. A solar installation comprising:
a support; and
a support frame supporting solar modules that are combined to form a solar panel;
said support frame supported on the support for pivoting movement about an elevation axis; and
said support frame forming, with respect to the elevation axis, a bottom section of the solar panel on a ground side and an adjoining top section of the solar panel;
said top section and said bottom section each having a respective width extension perpendicular to the elevation axis, wherein the width extension of the top section is greater than the width extension of the bottom section; and
wherein the bottom section is substantially wind-impermeable, and the top section of the solar panel has flow passage openings between groups of the solar modules.

2. The solar installation according to claim 1, wherein the solar modules are arranged in rows and the flow passage openings extend between the rows of the solar modules.

3. The solar installation according to claim 1, wherein a wind guiding device is provided on a ground-side edge of the bottom section of the solar panel.

4. The solar installation according to claim 2, wherein a wind guiding device is provided on a ground-side edge of the bottom section of the solar panel.

* * * * *